Dec. 3, 1935.  E. J. VON HENKE  2,022,699
APPARATUS FOR MANUFACTURING WELDED TUBING
Filed March 29, 1930  5 Sheets-Sheet 5

INVENTOR
Edmund J. von Henke
BY
Gifford, Scull & Burgess
ATTORNEYS.

Patented Dec. 3, 1935

2,022,699

UNITED STATES PATENT OFFICE 2,022,699

APPARATUS FOR MANUFACTURING WELDED TUBING

Edmund J. Von Henke, Chicago, Ill., assignor to American Electric Fusion Corporation, Chicago, Ill., a corporation of Illinois Application March 29, 1930, Serial No. 439,885

45 Claims. (Cl. 219—6)

This invention relates to a novel and improved tubing made by electrically welding together the edges of a strip of metal and to a novel and improved apparatus for performing the welding operation. The novel features will be best understood from the following description and the annexed drawings, in which I have shown a selected embodiment of the apparatus and of the product manufactured thereby.

In both Figs. 3 and 4, certain parts are broken away and others shown in section, for the purpose of better illustrating the invention.

Figure 1:
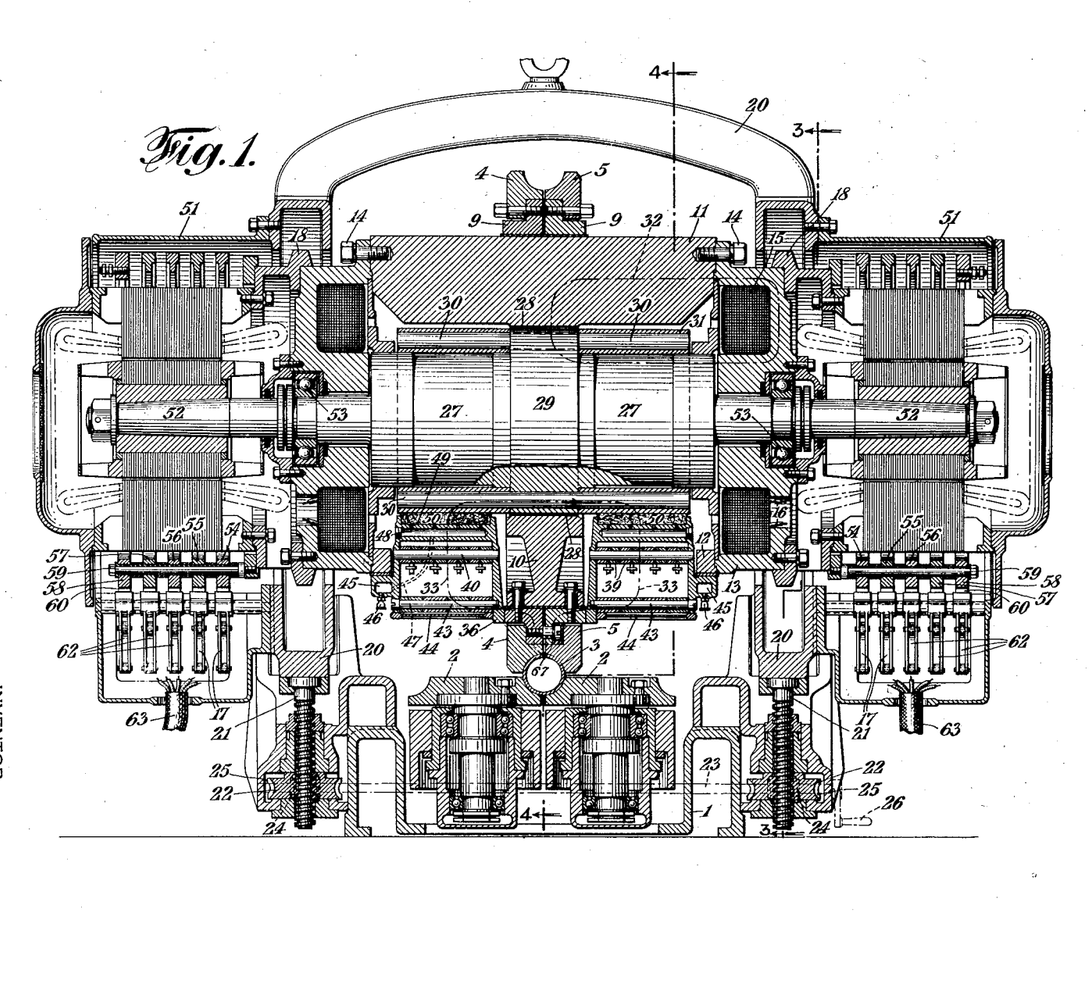
Fig. 1 is a vertical sectional view extending transversely through a welding machine constructed according to this invention.
Figure 2:
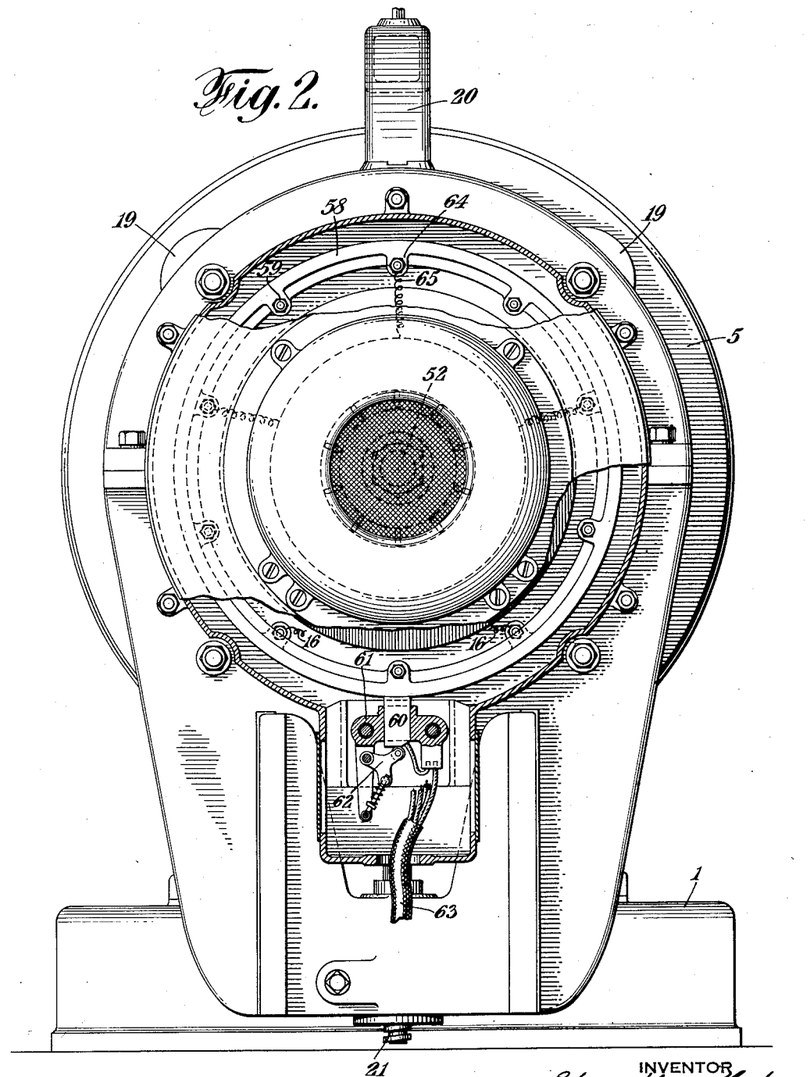
Fig. 2 is a view taken from the right of Fig. 1, parts being broken away and other parts shown in section.
Figure 3:
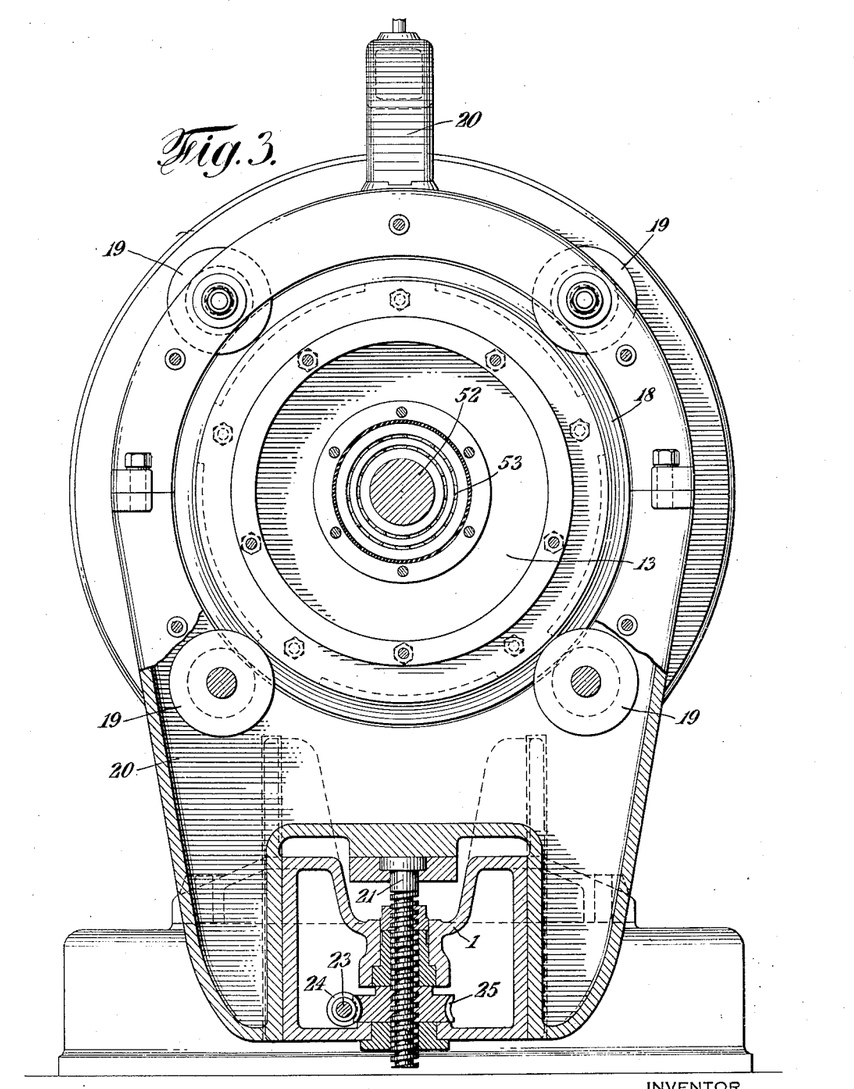
Fig. 3 is a section on the line 3—3 of Fig. 1.
Figure 4:
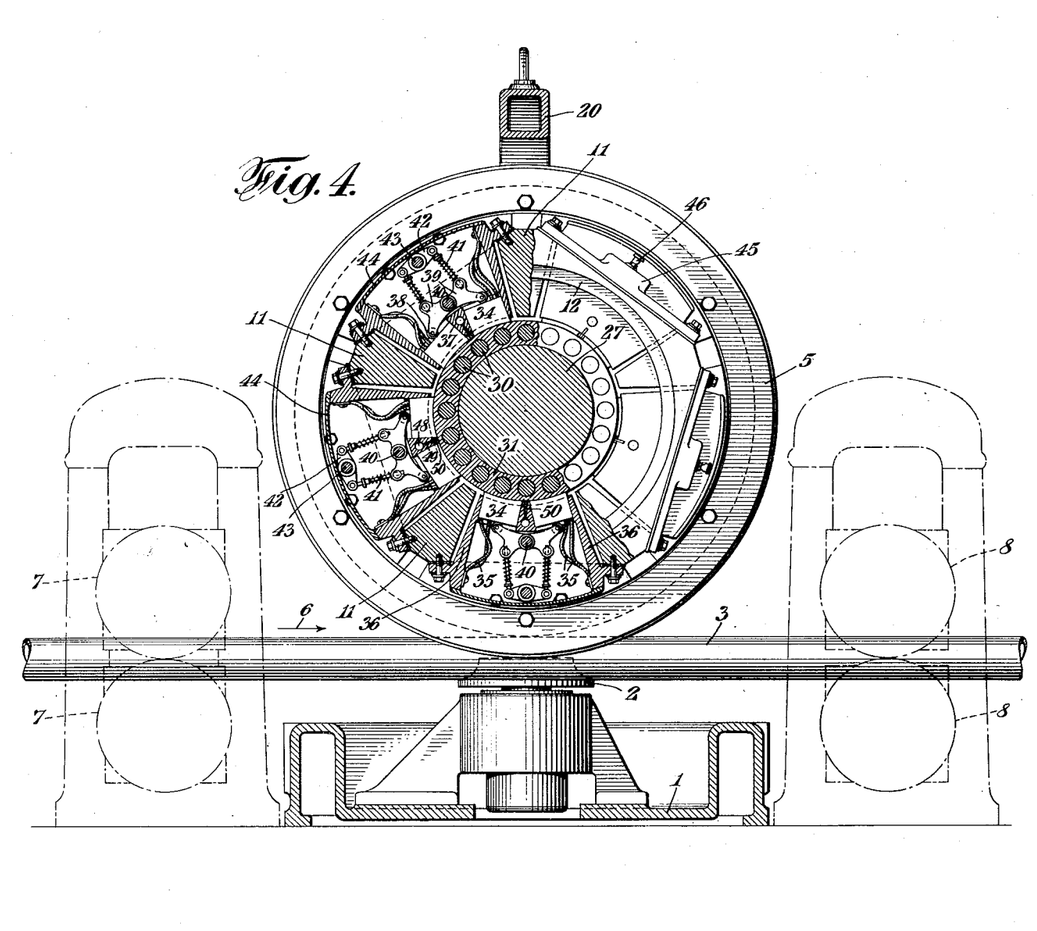
Fig. 4 is a section on the line 4—4 of Fig. 1.

Referring first to Figs. 1 to 4, inclusive, and more particularly to Fig. 1, the invention is shown as embodied in a machine mounted on a base plate 1 on which are disposed rolls 2 mounted on vertical axes and adapted to support tubing 3. These rolls 2 cooperate with ring electrodes 4 and 5 to form the throat through which the tubing passes as it is welded, current for providing the welding heat being supplied by the electrodes. It is to be understood that the tubing is traveling through the throat, as in the direction of the arrow 6 shown in Fig. 4, the tubing being formed from a strip or skelp by suitable forming apparatus which transforms the flat strip into a cylindrical form with the opposite edges of the strip in position to be welded to form the complete tube. The current passing through the strip at the adjoining edges thereof generates the welding heat as is well-known in the art, the edges being in contact with each other at the point where the current is applied to the strip. In Fig. 4, I have shown some of the forming rolls 7 of the forming apparatus and some of the rolls 8 of the apparatus designed to take the finished tubing away from the welding apparatus.

According to this invention, I bring the edges of the strip into contact with each other, providing sufficient pressure at the throat to insure a contact between the edges, and then pass across the seam formed by the abutting edges a continuous non-pulsating current flowing in one direction. This current will be generated in the following manner.

The rings 4 and 5 are insulated from each other by an air gap, as plainly shown in Fig. 1, and each is bolted to a ring bus bar 9, the two bus bars being also insulated from each other. The bus bars are each bolted to an annular frame 10, from which they are insulated, as shown.

The apparatus on one side of the center line in Fig. 1 is duplicated by that on the other and, therefore, in the remaining description I shall limit myself largely to a description of the apparatus on one side only of the center line. Projecting laterally from the frame 10 is a plurality of pole pieces 11, in this instance five in number being employed. The outer ends of these pole pieces are electrically connected by the ring 12 which, in turn, is electrically connected with the field end frame 13, which frame is secured to the pole pieces as by bolts 14. The field end frame is provided with an annular recess in which is disposed the coil 15 having electrical connections 16 to brushes 17, whereby electric current may be supplied to the windings of the coil. The field end frame is supported by means of a rail 18 bolted to the end frame and engaging a plurality of rollers 19, as best shown in Fig. 3. These rollers are mounted in a supporting frame 20 which is vertically adjustable by means of a screw 21 rotatably mounted on the base 1 and engaging a nut 22. The two nuts 22 are of course fixed against vertical movement and are preferably rotated together by rotation of a single shaft 23 provided with worms 24 engaging worm gears 25 formed on the nuts. The shaft may be rotated by any suitable means exemplified by a handle 26.

It should be understood that the frame 10 and pole pieces 11, ring 12 and field end frame 13, are all of conducting material, for example, steel. Rotatably mounted within the frame 10 and between the pole pieces 11 is a shaft 27, in this embodiment the shaft being of steel and being separated from the frame 10 at an air gap 28. The shaft is shown as provided with a central flange 29 through which extends a plurality of conductors 30, these conductors preferably being of copper and being disposed in collector rings 31 fast on the shaft 27. By this arrangement, it will be seen that a magnetic circuit is provided by the members 10, 11, 12, 13 and 27, this circuit being energized by the passage of current through the coil 15 and the lines of flux circulating approximately as indicated by the dot and dash line 32. Then, if the shaft 27 is rotated, the conductors 30 will cut the lines of flux, thus generating a continuous current flowing in one direction and of substantially constant amperage. This current will follow some such path as that indicated by the dot and dash line 33 passing from the conductors 30 through brushes 34 (Fig. 4), conductors 35, and brush holders 36, which in turn are held in rigid contact with the bus bars 9 (Fig. 1), and thence through the electrodes 4 and 5. Each brush holder is preferably disposed between adjacent pole pieces 11, as plainly shown in Fig. 4, and may be bolted thereto, although insulated therefrom as also plainly shown in that figure.

The brush holder is preferably made of one piece of metal having a partition 37 extending lengthwise of the shaft 27 and separating the brushes 34. These brushes may be held in close contact with the collector ring 31 by means of rollers 38 mounted in frames 39 pivoted on a shaft 40. These frames may be urged toward the brushes by means of springs 41 which surround rods pivoted at opposite ends to a frame and to a rocker 42 pivoted on a shaft 43. By this means each frame 39 may be swung into or out of operative relation with the brushes which it holds in position, and the spring 41 will hold it in either operative or inoperative position. The entire mechanism just described can be supported in the unitary metallic structure, the recess therein being closed by a plate 44.

The contact area between the brushes and the collector rings is very large, and in order to insure proper lubrication each brush holder is provided with a receptacle 45 for lubricant which may be inserted therein through suitable cups 46. The lubricant is conducted through a suitable conduit 47 to an annular space 48 having bores 49 leading to the contact surface of the collector ring. These bores may communicate with recesses in the inner faces of the partitions in which is disposed absorbent material 50 forming a wick which will wipe off the collector ring and also lubricate it during its rotation.

The shaft 27 is preferably rotated by means of motors mounted one on each end of the shaft, the casings for these motors, indicated at 51, being secured to the frame 20. The motors here shown are of the squirrel cage type, the rotor of each motor being secured to an end 52 of the shaft 27, and the shaft being mounted in bearings 53 in the field end frame 13. The stator of each motor is supported by an adjacent field end frame 13. The details of the motor need not be further described, except in connection with the means for supplying current thereto.

According to this invention, the frame 10 and pole pieces 11 may be considered as stationary with respect to the shaft 27. For example, the shaft 27 may be rotated at a speed of approximately 3450 R. P. M. and when the tubing 3 is stationary, the electrode rings and the frame secured thereto will also be stationary. However, when the tubing is moved through the throat, it is necessary from a practical standpoint that the electrode rings also move with it to prevent friction and, for that reason, the frame 10 carrying the electrode rings is rotatably supported by means of the rails 18 and the rolls 19 engaging these rails. The speed of rotation of the frame is relatively very small with respect to the speed of rotation of the shaft 27, being for example 20 R. P. M. as compared with the 3450 R. P. M. of the shaft, so that the effect of this relative movement between the frame and the shaft will have substantially no effect upon the electric current which is being generated and which is being supplied to the electrodes. When the frame rotates, however, it carries with it the stators of the motors and, therefore, it is necessary to provide means for supplying current to the motors at any position which the stators may take.

According to the embodiment shown herein, I provide a plurality of collector rings 54, 55, 56, 57 and 58. These rings may be supported upon suitable studs 59 spaced around the periphery of the rotor and each of these collector rings is engaged by a brush 60 mounted in a brush holder 61 and resiliently urged toward the respective ring by a suitable device indicated at 62. Each of the brushes is supplied with current from a conductor entering the casing 51 in a cable 63.

The details of one connection are shown in Fig. 2, it being understood that other connections are similarly made. On each ring is provided a lug 64 from which leads a connection 65. The connections 65 leading from the rings 56, 57 and 58 are used to supply three-phase current to the stator, while those connections leading from the rings 54 and 55 supply current to the connections 16 on the coil 15, these connections being indicated in Fig. 1. The connections themselves are omitted from Fig. 1 for the sake of clearness.

In operation, current is supplied to the motors arranged on opposite ends of the shaft 27, and this causes rotation of the shaft and by cutting the lines of magnetic flux, indicated at 32, by the conductors 30, there is generated a current of substantially constant amperage and flowing continuously in one direction as indicated by the arrow in Fig. 1, and along some such path as indicated by the dot and dash lines 33. The amount of current may be, for example, 20,000 amperes, which is sufficient to provide the proper welding heat to weld the edges of the strip in the throat to form the completed tubing. As the tubing is fed through the throat the electrodes, together with the frame and parts carried thereby, are rotated at substantially the same peripheral speed as the lineal speed of the tubing, rotating on the rollers 19. The shaft 27 and conductors carried thereby form the rotor of a continuous current generator, the stator of which is supplied by the frame 10, pole pieces 11, field end frame 13, ring 12, and the brushes and bus bars, the electrodes being directly secured to the starter. This generator is operated by motive power supplied by the two motors on the ends of the shaft 27, and by this dual arrangement of motors a well-balanced smoothly operating apparatus is provided. The electrodes being directly connected to the bus bars and they, in turn, being directly connected to the brush holders, it will be seen that the resistance to the flow of the continuous current through these connections to and from the electrodes is a negligible one.

Figure 5:
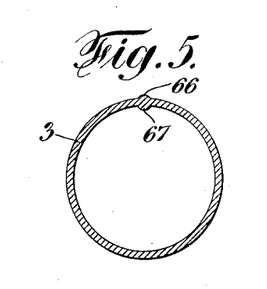
Fig. 5 is a cross-sectional view through a tube welded on the apparatus in this application.
Figure 6:
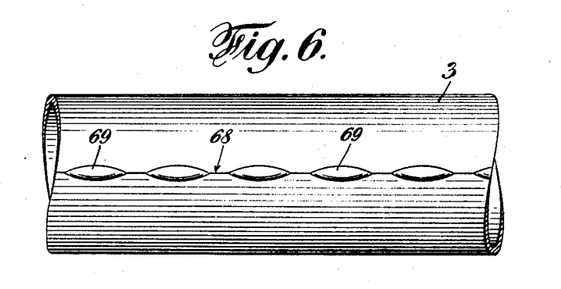
Fig. 6 is a view of a prior art welded seam extending longitudinally of the tube shown in Fig. 5.
Figure 7:
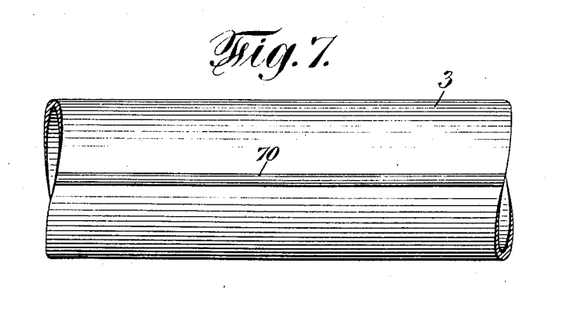
Fig. 7 is a view corresponding to Fig. 6, but showing a novel seam resulting from welding on a machine constructed as described herein.

The tubing resulting from welding with the apparatus described above is shown in Figs. 5 and 7. Referring to Fig. 5, I have shown therein a cross-section of a piece of tubing 3 in which the edges have been welded together to form the complete tubing with the form of a slight outer bur 66 and inner bur 67. The size of these burs is exaggerated for the sake of clearness. In Fig. 6 is shown a longitudinal view of a piece of tubing with the seam 68 shown as it appears when made according to prior art practice, using alternating or pulsating current. The result is an unevenness in the seam, the seam appearing to be formed of a plurality of what have been termed "stitches" 69. It is supposed that these stitches form what are in effect separate welds, but at any rate the seam is non-uniform in character along its length. According to my invention I obtain a tubing having a seam 70 of absolutely uniform character throughout its length. This is because of the substantial uniformity of the current passing across the seam.

By the employment of an apparatus constructed according to this invention, it is possible to obtain a much improved electrically welded tubing having a seam in which the character of the metal is substantially uniform throughout its length. Moreover, the thickness of the tubing wall is also substantially uniform throughout its circumference, only a slight bur being raised by welding according to my invention. The size of this bur when the meeting edges of the strip are accurately cut, is very slight, although it will of course vary with the accuracy of cutting the strip and also with the thickness of the tubing wall. The source of current is provided directly in the welding apparatus itself and is independent of all outside conditions such as variations in line voltage which might and often do cause undesirable fluctuations in the amount of current supplied to the welding throat. The supply of current in this invention is substantially constant and may be controlled by variations in the speed of rotation of the shaft.

The particular machine illustrated herewith is designed as stated above for a current of approximately 20,000 amperes, operating at a voltage of 2 to 4. The squirrel cage motors shown are designed to operate on 220 volts, 60 cycle three-phase current, developing 35 H. P., giving approximately 3450 R. P. M. of the shaft 27. The above quantities will of course be varied with different designs of apparatus intended for different purposes.

I claim:—

1. In an electric welding machine, a generator of continuous current of substantially constant amperage, circular electrodes secured to said generator, means cooperating with said electrodes to form a throat through which tubing may be fed, means rotatably supporting said generator whereby movement of the tubing through the throat may rotate the generator, and means to operate the generator.

2. In an electric welding machine, a generator of continuous current of substantially constant amperage, circular electrodes secured to said generator, means cooperating with said electrodes to form a throat through which tubing may be fed, means rotatably supporting said generator whereby movement of the tubing through the throat may rotate the generator, a motor secured to the generator to rotate therewith during movement of the tubing, and means to operate the generator from the motor.

3. In an electric welding machine, a stator, circular electrodes secured to said stator, a rotor mounted within said stator, means associated with said stator and rotor to generate continuous current of substantially constant amperage upon rotation of the rotor and to conduct said current through said electrodes and the work contacting therewith, means rotatably supporting said stator whereby movement of the work may rotate the stator, and means to rotate said rotor.

4. In an electric welding machine, a stator, circular electrodes secured to said stator, a rotor mounted within said stator, means associated with said stator and rotor to generate continuous current of substantially constant amperage upon rotation of the rotor and to conduct said current through said electrodes and the work contacting therewith, means rotatably supporting said stator whereby movement of the work may rotate the stator, and a motor having a stator and rotor secured respectively to the stator and rotor of the generator.

5. In an electric welding machine, a generator of continuous current of substantially constant amperage, circular electrodes secured to said generator, means cooperating with said electrodes to form a throat through which tubing may be fed, means rotatably supporting said generator whereby movement of the tubing through the throat may rotate the generator, means to operate the generator, and means to bodily adjust the generator with respect to the tubing in said throat.

6. In an electric welding machine, a base having a frame mounted thereon, a plurality of rollers on said frame, a generator having a rail engaging said rollers to rotatably support the generator thereon, circular electrodes secured to said generator, means on the base cooperating with the electrodes to form a throat through which tubing may be fed, and means to raise and lower the frame on the base to adjust the electrodes with respect to the tubing in the throat.

7. In an electric welding machine, a base having a frame mounted thereon, a plurality of rollers on said frame, a generator having a rail engaging said rollers to rotatably support the generator thereon, circular electrodes secured to said generator, means on the base cooperating with the electrodes to form a throat through which tubing may be fed, and means to operate the generator.

8. In an electric welding machine, a base, a generator disposed above said base and comprising a stator, a circular rail at each end of said stator, a frame at each of said ends and carrying rolls engaging said rails to rotatably support said stator, circular electrodes secured to said stator, means on the base cooperating with the electrodes to form a throat through which tubing may be fed, means to operate the generator, and means to raise and lower said frames in unison.

9. An electric welding machine comprising a shaft, two circular electrodes surrounding said shaft and insulated from each other, a stator disposed between said shaft and electrodes and secured to the electrodes, means for creating a magnetic field cut by said shaft upon rotation thereof, two sets of brushes contacting with said shaft and each electrically connected to one of said electrodes, and means for rotating said shaft.

10. In an electric welding machine, a stator, circular electrodes secured to said stator, a rotor mounted within said stator, means associated with said stator and rotor to generate continuous current of substantially constant amperage upon rotation of the rotor and to conduct said current through said electrodes and the work contacting therewith, means rotatably supporting said stator whereby movement of the work may rotate the stator, and motors disposed at the opposite ends of said generator and each having a stator and a rotor connected respectively to the stator and rotor of the generator.

11. In an electric welding machine, a stator, circular electrodes secured to said stator, a rotor mounted within said stator, means associated with said stator and rotor to generate continuous current of substantially constant amperage upon rotation of the rotor and to conduct said current through said electrodes and the work contacting therewith, means rotatably supporting said stator whereby movement of the work may rotate the stator, and means at both ends thereof to rotate said rotor.

12. An electric welding machine comprising a rotating shaft, a motor operatively connected to said shaft, a magnetizing coil surrounding said shaft and forming a magnetic field through which the shaft rotates, a stator surrounding said shaft, electrodes mounted on said stator and insulated from each other, and two sets of brushes each electrically connected to one of said electrodes and contacting with said shaft.

13. In an electric welding machine, a circular frame, circular electrodes mounted on the periphery of the frame and insulated from each other and from the frame, means cooperating with said electrodes to form a throat through which tubing may be fed, a rotor disposed in an opening in said frame, brushes secured to said frame on opposite sides thereof and contacting with said rotor, electrical connections between the brushes on each side of the frame and the electrode on the same side, and means forming magnetic fields through which said rotor moves, one on each side of the frame.

14. In an electric welding machine, a circular frame, circular electrodes mounted on the periphery of the frame and insulated from each other and from the frame, means cooperating with said electrodes to form a throat through which tubing may be fed, a rotor disposed in an opening in said frame, brushes secured to said frame on opposite sides thereof and contacting with said rotor, electrical connections between the brushes on each side of the frame and the electrode on the same side, and a magnetizing coil on each side of the frame and surrounding the rotor.

15. In an electric welding machine, a circular frame, circular electrodes mounted on the periphery of the frame and insulated from each other and from the frame, means cooperating with said electrodes to form a throat through which tubing may be fed, a rotor disposed in an opening in said frame, pole pieces secured to the frame and extending from opposite sides thereof lengthwise of the rotor and spaced apart around the rotor, brush holders disposed between adjacent pole pieces and secured thereto but insulated therefrom, brushes carried by said holders and contacting with the rotor, electrical connections from the brushes on each side of the frame to the electrode on that side, and means forming two magnetic fields through which said rotor moves, each field embracing the pole pieces on one side of the frame.

16. In an electric welding machine, a circular frame, circular electrodes mounted on the periphery of the frame and insulated from each other and from the frame, means cooperating with said electrodes to form a throat through which tubing may be fed, a rotor disposed in an opening in said frame, pole pieces secured to the frame and extending from opposite sides thereof lengthwise of the rotor and spaced apart around the rotor, brush holders disposed between adjacent pole pieces and secured thereto but insulated therefrom, brushes carried by said holders and contacting with the rotor, electrical connections from the brushes on each side of the frame to the electrode on that side, a magnetizing coil surrounding the rotor at the ends of the pole pieces on either side of the frame, and a field end frame surrounding the shaft on the other side of the coil from the pole pieces.

17. In an electric welding machine, a stator, circular electrodes secured to said stator, a rotor mounted within said stator, means associated with said stator and rotor to generate continuous current of substantially constant amperage upon rotation of the rotor and to conduct said current through said electrodes and the work contacting therewith, means rotatably supporting said stator whereby movement of the work may rotate the stator, a motor having a stator and rotor secured respectively to the stator and rotor of the generator, collector rings secured to said stators to rotate therewith upon movement of the work, electrical connections from said rings to the motor stator, and stationary brushes contacting with said rings and adapted to supply current thereto.

18. In an electric welding machine, a stator, circular electrodes secured to said stator, a rotor mounted within said stator, means associated with said stator and rotor to generate continuous current of substantially constant amperage upon rotation of the rotor and to conduct said current through said electrodes and the work contacting therewith, said means comprising a magnetizing coil, means rotatably supporting said stator whereby movement of the work may rotate the stator, a motor having a stator and rotor secured respectively to the stator and rotor of the generator, collector rings secured to said stator to rotate therewith upon movement of the work, electrical connections from some of said rings to the motor stator and from other of said rings to the magnetizing coil, and stationary brushes contacting with said rings and adapted to supply current thereto.

19. In an electric welding machine, a stator, circular electrodes secured to said stator, a rotor mounted within said stator, means associated with said stator and rotor to generate an electromotive force upon rotation of the rotor and to conduct the resulting current through said electrodes and work contacting therewith, means rotatably supporting said stator whereby the stator may be made to rotate with movement of the work and means for driving said rotor.

20. In an electric welding machine, a stator, circular electrodes secured to and surrounding said stator, a rotor mounted within said stator, means associated with said stator and rotor to generate an electromotive force upon rotation of the rotor and to conduct the resulting current through said electrodes and work contacting therewith, means rotatably supporting said stator whereby the stator may be made to rotate with movement of the work and means for driving said rotor.

21. In an electric welding machine, in combination, a homopolar generator, circular electrodes secured to said generator and electrically connected to the generating elements thereof, means rotatably supporting the stator of the generator whereby the stator may be made to rotate in response to movement of work contacting with said electrodes and means for driving the rotor of the generator.

22. In an electric welding machine, in combination, a homopolar generator, circular electrodes secured to and surrounding said generator and electrically connected to the generating elements thereof, means rotatably supporting the stator of the generator whereby the stator may be made to rotate in response to movement of work contacting with said electrodes and means for driving the rotor of the generator.

23. In a machine for electrically welding together edges of work disposed on opposite sides of a seam, two circular electrodes insulated from each other, a generator of electric current comprising a stator and a rotor, means securing said electrodes to said stator, means for feeding said work into position wherein said electrodes contact with the work on opposite sides of said seam, means rotatably supporting said stator and electrodes whereby they may rotate as said work is fed into contact with the electrodes, means to rotate said rotor to generate current, and means for passing the current thus generated through said electrodes and through said seam.

24. In a machine for electrically welding together edges of work disposed on opposite sides of a seam, two circular electrodes insulated from each other, a generator of electric current comprising a stator and a rotor, means securing said electrodes to said stator, means for feeding said work into position wherein said electrodes contact with the work on opposite sides of said seam, means rotatably supporting said stator and electrodes whereby they may rotate as said work is fed into contact with the electrodes, a motor connected to said rotor to rotate the same to generate current, and means for passing the current thus generated through said electrodes and through said seam.

25. In a machine for electrically welding together edges of work disposed on opposite sides of a seam, two circular electrodes insulated from each other, a generator of electric current comprising a stator and a rotor, means securing said electrodes to said stator, means for feeding said work into position wherein said electrodes contact with the work on opposite sides of said seam, means rotatably supporting said stator and electrodes whereby they may rotate as said work is fed into contact with the electrodes, a motor having a stator and a rotor, means connecting together said stators, means connecting together said rotors whereby rotation of the rotor of the motor will rotate the rotor of the generator to generate current, and means for passing the current thus generated through said electrodes and through said seam.

26. In an electric welding machine, a generator of electric current, circular electrodes secured to said generator, means cooperating with said electrodes to form a throat through which tubing may be fed, means rotatably supporting said generator whereby movement of the tubing through the throat may rotate the generator, means to operate the generator, and means to bodily adjust the generator with respect to the tubing in said throat.

27. In an electric welding machine, a base having a frame mounted thereon, a generator of electric current rotatably mounted on said frame, circular electrodes secured to said generator, means on the base to support tubing in position to be welded by said electrodes, and means to raise and lower the frame on the base to adjust the electrodes with respect to the tubing.

28. In an electric welding machine, a base, a generator of electric current, a plurality of bearings rotatably supporting said generator on said base, circular electrodes secured to said generator, means on the base to support tubing in position to be welded by said electrodes, and means to raise and lower said bearings in unison.

29. In an electric welding machine, a stator, circular electrodes secured to said stator, a rotor mounted within said stator, means associated with said stator and rotor to generate electric current upon rotation of the rotor and to conduct said current through said electrodes and the work contacting therewith, means rotatably supporting said stator whereby movement of the work may rotate the stator, a motor having a stator and rotor secured respectively to the stator and rotor of the generator, collector rings secured to said stator to rotate therewith upon movement of the work, electrical connections from said rings to the motor, and stationary brushes contacting with said rings and adapted to supply current thereto.

30. In an electric welding machine, a stator, circular electrodes secured to said stator, a rotor mounted within said stator, means associated with said stator and rotor to generate electric current upon rotation of the rotor and to conduct said current through said electrodes and the work contacting therewith, said means comprising a magnetizing coil, means rotatably supporting said stator whereby movement of the work may rotate the stator, a motor having a stator and rotor secured respectively to the stator and rotor of the generator, collector rings secured to said stator to rotate therewith upon movement of the work, electrical connections from some of said rings to the motor and from other of said rings to the magnetizing coil, and stationary brushes contacting with said rings and adapted to supply current thereto.

31. In apparatus for electric resistance welding of tubing, an electric circuit for the welding current comprising conductors through which said welding current flows, and an electrode contacting with the tube being welded, said electrode and conductors being fixedly, electrically connected to each other.

32. Apparatus for progressive electric resistance welding, a generator having a mechanically rotated rotor and a stator, a roller electrode, and fixed electrical connections between said stator and said roller electrode.

33. In apparatus for electric resistance welding, a generator serving as a source of welding current, a rotating electrode, and only mechanically fixed conductors between said generator and said rotating electrode.

34. In apparatus for electric resistance welding, the combination of a generator having a relatively rapidly rotating rotor, a relatively slowly rotating electrode having a common axis of rotation with said generator, and fixed mechanical and electrical connections between said generator and said electrode, said electrode being disposed to contact with the work to be welded.

35. In apparatus for electric resistance welding, a motor and a generator on a common shaft, the stators of said motor and said generator being fixedly connected together and rotatably mounted about the axis of said shaft, and an electrode fixedly connected to said stators.

36. In apparatus for electric resistance welding of tubing, a motor and a generator on a common shaft, stators of said motor and said generator fixedly connected and rotatably mounted about the axis of said shaft, and an electrode fixedly connected to said stators, means for traversing the tube in contact with said electrode, said electrode being adapted to make substantially non-slipping, rolling contact with said tube, said electrode having fixed electrical connections to the stator of said generator.

37. In apparatus for progressive electric resistance welding, a motor and a generator having a common axis, the stators of said motor and said generator being fixedly connected and mounted to rotate about said common axis, the rotors of said motor and generator being fixedly connected and mounted to rotate about said common axis, and an electrode fixedly connected to said stators, said electrode being disposed to contact with and conduct welding current to the work to be welded.

38. In apparatus of the class set forth, a motor-generator unit comprising a motor and a generator, a shaft on which the rotors of said motor and said generator are fixedly mounted, the stators of said motor and said generator being fixedly connected and rotatably mounted about said shaft, a work support, a pair of electrodes connected to said stators and adapted to engage the work on said work support, and means for causing relative traversing movement of said electrodes and said work.

39. Apparatus for electric resistance seam welding comprising a motor-generator unit having the stator unit of the motor and the stator unit of the generator fixedly connected, means for rotatably supporting said stator units, electrodes carried by said stator units, adapted to contact with the metal constituting the work upon the respectively opposite sides of the seam to be welded, conductors in said generator stator, and means for directly electrically connecting said conductors to said electrodes without the use of brushes or other relatively moving current collecting devices.

40. In a machine for electrically welding together edges of work disposed on opposite sides of a seam to form one piece across said seam, two circular electrodes insulated from each other, means for progressively feeding said work into position wherein said electrodes contact with the work on opposite sides of said seam, means rotatably supporting said electrodes whereby they may rotate as said work is progressively fed into contact therewith, a generator of continuous current of substantially constant high amperage, and means of negligible resistance to pass said current in one direction only to one of said electrodes and thence through said seam to the other of said electrodes.

41. In a machine for electrically welding together edges of work disposed on opposite sides of a seam to form one piece across said seam, two circular electrodes insulated from each other, means for progressively feeding said work into position wherein said electrodes contact with the work on opposite sides of said seam but on the same side of the piece, means rotatably supporting said electrodes whereby they may rotate as said work is progressively fed into contact therewith, and a generator of continuous current of substantially constant high amperage, and means of negligible resistance to pass said current in one direction only to one of said electrodes and thence through said seam to the other of said electrodes.

42. In a machine for electrically welding together edges of work disposed on opposite sides of a seam to form one piece across said seam, two circular electrodes insulated from each other, a generator of continuous current of substantially constant amperage and comprising a stator and a rotor, means for feeding said work into position where said electrodes contact with the work on opposite sides of said seam, means rotatably supporting said electrodes whereby they may rotate as said work is fed into contact with the electrodes, means to rotate said rotor to generate current, and means for passing the current thus generated directly from the generator through a connection of negligible resistance to one of said electrodes and thence through said seam to the other of said electrodes.

43. In a machine for electrically welding together edges of work disposed on opposite sides of a seam to form one piece across said seam, two circular electrodes insulated from each other, a generator of continuous current of substantially constant amperage and comprising a stator and a rotor, means directly securing said stator to said electrodes, means for feeding said work into position where said electrodes contact with the work on opposite sides of said seam, means rotatably supporting said stator and electrodes whereby they may rotate as said work is fed into contact with the electrodes, means to rotate said rotor to generate current, and means for passing the current thus generated through one of said electrodes and through said seam to the other of said electrodes.

44. An electric welding machine comprising a rotor, two circular electrodes surrounding said rotor and insulated from each other, a stator disposed between said rotor and electrodes and secured to the electrodes, means for creating a magnetic field cut by said rotor upon rotation thereof, two sets of brushes contacting with said rotor and each electrically connected to one of said electrodes, and means for rotating said rotor.

45. An electric welding machine comprising a rotor, a motor operatively connected to said rotor, a magnetizing coil forming a magnetic field through which the rotor rotates, a stator surrounding said rotor, electrodes mounted on said stator and insulated from each other, and two sets of brushes each electrically connected to one of said electrodes and contacting with said rotor.

EDMUND J. VON HENKE.